United States Patent [19]

Hyodo et al.

[11] Patent Number: 4,686,126
[45] Date of Patent: Aug. 11, 1987

[54] TUBULAR LINING MATERIAL FOR CITY WATER PIPE LINES

[75] Inventors: Masakatsu Hyodo; Koji Kusumoto; Takuji Sokawa, all of Osaka, Japan

[73] Assignee: Ashimori Industry Co., Ltd., Osaka, Japan

[21] Appl. No.: 788,945

[22] Filed: Oct. 18, 1985

[51] Int. Cl.$^4$ .................. F16L 55/18; F16L 57/00
[52] U.S. Cl. ........................ 428/36; 138/97; 428/265
[58] Field of Search .............. 428/36, 265; 138/97

[56] References Cited

U.S. PATENT DOCUMENTS

| | | | |
|---|---|---|---|
| 4,292,463 | 9/1981 | Bow et al. | 428/344 X |
| 4,322,574 | 3/1982 | Bow et al. | 428/344 X |
| 4,334,943 | 6/1982 | Zenbayashi et al. | 156/330 X |
| 4,350,548 | 9/1982 | Zenbayashi et al. | 156/156 |
| 4,368,091 | 1/1983 | Outsuga et al. | 156/287 |
| 4,600,615 | 7/1986 | Hyodo et al. | 428/36 |

Primary Examiner—Henry F. Epstein
Attorney, Agent, or Firm—Birch, Stewart, Kolasch & Birch

[57] ABSTRACT

A tubular lining material for city water pipe lines, which comprises a tubular textile jacket made of warps and a weft woven in a tubular form overlaid with a fluid-impervious coat of a flexible synthetic resin, at least one of the warps and the weft being comprised of threads manufactured by intertwisting filament yarns with spun yarns and/or spun-like textured yarns of synthetic fibers, and the flexible synthetic resin comprising a blend of 60–40% by weight of a polyethylene resin and 40–60% by weight of a styrene-ethylene-butylene-styrene resin, having a stress-crack resisting property of at least 1000 hours which penetrates the interstices of the fabric structure of the tubular textile jacket. The tubular lining material is remarkably improved in flexibility, heat-resistance, abrasion-resistance, stress-crack resistance and other mechanical strength properties and is harmless to drinking water.

7 Claims, 2 Drawing Figures

TUBULAR LINING MATERIAL FOR CITY WATER PIPE LINES

BACKGROUND OF THE INVENTION

1. Field of the Invention

The present invention relates to a tubular lining material for city water pipe lines, chiefly those buried in the ground. More particularly, the present invention relates to a tubular lining material utilizable for repair or reinforcement of city water pipe lines, especially those already constructed and buried in the ground, which comprises a tubular textile jacket overlaid with a coat of a selected synthetic resin which is not only satisfactory in mechanical strength but also harmless to drinking water and is applied onto the inner surface of the pipe lines according to the so-called "evagination-lining" method.

2. Description of the Prior Art

In recent years, a tubular lining material was used for the purpose of repair and reinforcement of superannuated pipe lines which had been constructed and buried in the ground. In case of underground pipe lines such as gas conduits, water pipe lines, oil pipe lines, sewage pipes made of concrete or porcelain and pipe lines enclosing power transmission wires or telecommunication cables, their superannuation or damage thereto often causes dangerous leakage of combustible fluids or electricity and unexpected rupture of water, thus resulting in serious accidents and traffic disturbance. As pipe-exchange work especially for underground pipe lines to prevent such problems involved much cost and difficulty, the use of a tubular lining material for repairing and reinforcing the pipe lines is in wide use. A method for lining pipe lines with a resin-coated tubular textile jacket as a tubular lining material has also been improved upon several times and a typical one now advantageously utilized is disclosed, for example, in U.S. Pat. Nos. 4,334,943, 4,368,091 and 4,350,548 and generally comprises the steps of applying a binder onto the inner surface of a tubular lining material having a resinous coat on the exterior surface thereof, passing the tubular lining material in flattened state through a pipe line and evaginating the tubular lining material within the pipe line under fluid pressure while allowing the lining material to advance within the pipe line and simultaneously bonding the evaginated tubular lining material onto the inner surface of the pipe line by the aid of a binder with or without the use of a leading rope-like elongated material, such as a belt, which has previously been passed through the tubular lining material beyond its full length and is drawn from the opposite end of the pipe line. The method disclosed in these patents is generally called the "evagination-lining method" and is considered to be the most desirable of the existing pipe-lining methods, particularly in that such lining material can easily be inserted into pipe lines to be treated and is applicable to pipe lines having a plurality of bends or curved portions within a short period of time irrespective of the length and diameter of the pipe lines.

A tubular lining material utilizable for such evagination-lining method should be flexible, air-impervious and satisfactory in strength in both longitudinal and lateral directions. Thus, a tubular lining material suitably used for this lining method is a tubular textile jacket made of warps and a weft woven (or knitted) in a tubular form overlaid with an air- or fluid-impervious coat of a flexible synthetic resin. On application of the lining material onto the inner surface of the pipe line according to the evagination-lining method, a binder is first applied onto the inner surface of the tubular lining material. At this stage, the lining material is provided on the exterior surface thereof with the resinous coat and on the inner surface thereof with a layer of a binder to form a three-layered structure and is kept in a flattened state so that the lining material may be smoothly inserted into the pipe line with or without the aid of a leading belt. The lining material is then allowed to advance within the pipe line while turning the lining material inside out (evagination) under fluid pressure whereby the evaginated lining material is bonded onto the inner surface of the pipe line with the binder being interposed between the pipe line and the tubular textile jacket, exposing as the innermost wall of the pipe line the resinous coat which prevents any leakage of a fluid passed through the pipe line and has a smooth surface capable of reducing friction between the pipe line and the flowing fluid to assure smooth flow of the fluid. Thus, a synthetic resin used as the resinous coat of the lining material should have flexibility and moderate stretchability and strength and is excellent in heat-resistance, abrasion-resistance and water-resistance. In case the lining material is used for city water pipe lines, however, the synthetic resin constituting the resinous coat is required to be physiologically safe under the regulations for drinking water. In Japan, synthetic resins utilizable for city water pipe lines are specified in the specifications established by the Japan Water Works Association (JWWA) organized by all the public enterprises for city water. Prior to actual use, pipes and the incidental materials used for city water should obtain a type certificate from JWWA. Thus, synthetic resins used as the resinous coat of the lining material must also satisfy the requirements defined in the specifications established by JWWA. On the other hand, drinking water supplied from such city water pipe lines has to satisfy the requirements specified in the various test items in the regulations of the Ministry of Health and Welfare relating to the standard of drinkable water under the provision of Article 4, Par. 1 of the City Water Law. Similar requirements for the quality of drinkable water are also seen in other countries. In the U.S.A., for example, the first relevant law named "the Safe Drinking Water Act" (Public Law 93-523) was enforced by the U.S. Congress in 1974 for all the federal public agencies for city water, and subsequently "the National Interim Primary Drinking Water Regulations" and "the Secondary Drinking Water Regulations" were proposed as guidelines for checking the quality of drinking water and are enforceable by the U.S. Environmental Protection Agency (USEPA). In addition, similar severe standards of drinking water were established by European countries and WHO and some regulations are put in force to protect public health. In any country, therefore, materials used for supply and storage of drinking water have to meet the severe requirements specified in the worldwide common regulations.

According to the specifications established by JWWA, lining materials for city water pipe lines are regarded equivalent to tar epxoy resin paints applicable to the inner surface of city water pipe lines. Thus, the regulations "Tar Epoxy Resin Paints for Water Works and Method of Coating" (K 115-1974) are applied to the examination of lining materials for city water pipe lines. In order that resin-coated lining materials are utilizable for repairing or reinforcing city water pipe lines under the regulations K 115-1974, the following properties are required for drinking water passed through the resin-coated lining materials:

(1) To be 0.5 or less in turbidity
(2) To be 1 or less in color scale
(3) to be 0.7 ppm or less in the amount of potassium permanganate consumed
(4) To be 0.7 ppm or less in the amount of residual chlorine reduced
(5) To have a phenol content of 0.005 ppm or less
(6) To show no detection of amines
(7) To show no detection of cyanides
(8) Not to be abnormal in odor and taste.

Polyurethane elastic resins, polyester elastomers and the like synthetic resins used as a resinous coat on the tubular lining materials for ordinary gas conduits fail to meet the above requirements as these resins can impart, for example, any residual amine to drinking water passed through the lined pipe line.

Thus, the present inventors have extensively researched various synthetic resins to check what kind of resin could satisfy the test items required for materials utilizable for city water pipe lines. As a result of the research, it was found that synthetic resins utilizable for this purpose were limited only to fluororesins and resins of the polyolefin series. Of these utilizable synthetic resins, the fluororesins are expensive and poor in extrusion characteristics and are thus inappropriate for the purpose of this invention. Consequently, synthetic resins utilizable as the resinous coat of the lining material for city water pipe line are inevitably limited only to those of the polyolefin series.

In general, the resins of polyolefin series involve, for example, high density polyethylene (HDPE), medium density polyethylene (MDPE), low density polyethylene (LDPE), atactic or isotactic polypropylene (PP) and polybutene-1 (PB). Among these polyolefins, HDPE and MDPE are devoid of flexibility, while LDPE is poor in stress-crack resistance, PP is poor in flexibility irrespective of whether it is crystalline or amorphous, and the heat-resistance property of PB deteriorates and shows a "whitening" phenomenon at a turning point on evagination when used as a resinous coat on the lining material according to the evagination process. Thus, these polyolefins are advantageous in some aspects but disadvantageous in others.

In recent years, linear low density polyethylene (LLDPE) is being watched in the field of manufacturing lining materials for city water pipe lines since LLDPE possesses a combination of flexibility, as seen in LDPE, and good abrasion-resistance and stress-crack resistance as seen in HDPE. This LLDPE is a polyolefin containing predominantly polyethylene, which is obtainable by copolymerization of ethylene with a smaller proportion of an α-olefin, and belongs, as per density, to a group of low density polyethylenes (LDPE). This LLDPE has such a molecular structure that it has a very small number of long chain branches and is similar to a purely linear high density polyethylene. Consequently, LLDPE is excellent in not only tensile strength and elongation but also in stress-crack resistance and is harmless to drinking water. These useful properties make LLDPE particularly suitable as a resinous coat of the lining material for city water pipe lines.

Having discovered such excellent characteristics of LLDPE, the present inventors have already devised a tubular lining material using LLDPE as a resinous coat thereof (Japanese Utility Model Appln. No. Sho. 58-176565). Although LLDPE itself exhibited excellent mechanical strength as a resinous coat of the lining material, there were found some problems in the tubular lining material of that utility model, especially in the event the resin is used as a resinous coat on a tubular textile jacket as the substrate. As LLDPE has a Shore D hardness as high as 50, it may not be said to be a satisfactorily flexible resin. For this reason, it was somewhat difficult to evaginate the tubular lining material, onto which LLDPE had been applied as a resinous coat, under normal conditions adopted in the evagination-lining method. If the fluid pressure necessary for evagination is elevated or the drawing force acting on a leading belt for the lining material is increased in the evagination-lining method to facilitate evagination, it will apparently cause damage to the tubular textile jacket. In this lining method, the lining material evaginated and attached to the inner surface of the pipe line is heated at the final stage to cure a binder interposed between the lining material and the pipe line as a result of the evagination. This heat treatment is usually carried out by passing steam through the lined pipe line. As LLDPE is not so high in heat resistance, however, the innermost resinous coat undergoes partial fusion during this heat treatment to incur possibility the forming of pin holes in the resinous coat. Thus, the tubular lining material of this utility model still leaves a problem to be solved.

Under the above circumstances, there is still a great demand for developing a new tubular lining material for city water pipe lines, which can overcome the above mentioned drawbacks.

SUMMARY OF THE INVENTION

Accordingly, it is an object of the present invention to provide a new tubular lining material for city water pipe lines, which satisfies all the test items required for materials utilizable for city water pipe lines.

It is another object of the present invention to provide a tubular lining material for city water pipe lines, which is improved in flexibility and heat-resistance to overcome the drawbacks as seen in the prior art lining materials.

It is still another object of the present invention to provide a tubular lining material for city water pipe lines, which uses as a resinous coat thereof two different synthetic resins specifically selected in a specific proportion to improve mechanical characteristics of the resinous coat while satisfying the requirements for use in city water pipe lines.

It is further object of the present invention to provide a tubular lining material for city water pipe lines which uses a tubular textile jacket woven with specifically selected yarns to improve bonding of the resinous coat thereto by anchoring action.

It is still further objects of the present invention to use a novel lining material for repairing or reinforcing city water pipe lines.

Other objects, features and advantages of the present invention will become apparent more fully from the following description.

As a result of further extensive researche made on various synthetic resins to develop a new resinous material utilizable as a resinous coat of the lining material for city water pipe lines and improved to overcome the drawbacks in the prior are resins, it has now been found surprisingly that when LLDPE is blended with a specific proportion of styrene-ethylene-butylene-styrene (SEBS), the resultant resin mixture exhibits outstanding physical characteristics suited as a resinous coat of the lining material for city water pipe lines. Namely, such resin mixture exhibits excellent flexibility, combined with high stress-crack resistance and good heat- and abrasion-resistance. The present invention has been accomplished on the basis of the above finding.

DETAILED DESCRIPTION OF THE INVENTION

In accordance with the present invention, there is provided a tubular lining material for city water pipe lines, which comprises a tubular textile jacket made of warps and a weft woven in a tubular form overlaid with a fluid-impervious coat of a flexible synthetic resin and is applicable onto the inner surface of a city water pipe line in such a manner that the tubular lining material with a binder on the inner surface thereof is inserted into the pipe line and allowed to advance within the pipe line while turning the tubular lining material inside out under fluid pressure thereby applying the tubular lining material onto the inner surface of the pipe line with the binder being interposed between the pipe lines and the tubular lining material, characterized in that at least one of the warps and the weft is comprised of threads manufactured by intertwisting filament yarns and spun yarns of synthetic fibers, the flexible synthetic resin comprising a blend of 60–40% of a polyethylene resin and 40–60% of a styrene-ethylene-butylene-styrene resin having a stress-crack resistance of at least 1000 hours, the flexible synthetic resin penetrating the interstices of the fabric structure of the tubular textile jacket.

The polyethylene resin used as one component of the synthetic resin has a stress-crack resistance of at least 1000 hours and is generally selected from a linear low density polyethylene resin (LLDPE) having a density of from 0.920–0.930 $g/cm^3$, a crosslinked polyethylene resin having a density of 0.920–0.930 $g/cm^3$ and a high density polyethylene resin (HDPE) having a density of 0.950–0.960 $g/cm^3$.

In general, polyethylene becomes higher in durability as its density becomes higher but polyethylene becomes greater in flexibility as its density becomes lower. Among polyethylene resins, therefore, high density polyethylene (HDPE) and medium density polyethylene (MDPE) are poor in flexibility while low density polyethylene (LDPE) is inferior in stress-crack resistance, although higher in flexibility. However, the linear low density polyethylene (LLDPE) preferably used as the polyethylene resin in the present invention is, as described previously a copolymeric polyolefin containing predominantly polyethylene which possesses a combination of flexibility with abrasion-resistance and stress-crack resistance. The LLDPE itself has such characteristic properties as a tensile strength of about 330 $kg/cm^2$, an elongation of about 740%, a softening point of 100° C., a melting point of 120° C., a Shore D hardness of about 50 and a stress-crack resistance of at least 1000 hours.

The crosslinked polyethylene having a density of 0.920–0.930 $g/cm^3$ which can also be used as an equivalent to LLDPE as one component of the utilizable synthetic resin is derived from polyethylene having a linear structure by changing its linear structure to a network structure in such manner that the linear polyethylene molecules are mutually bonded chemically with the aid of an organic peroxide or hydroperoxide decomposable at a temperature near the melting point of the polyethylene used or that the linear polyethylene molecules are exposed under actinic irradiation, for example, from an electron gun to initiate crosslinking of the linear polyethylene molecules. By such modification, polyethylene, e.g. LDPE can be modified to have a significantly enhanced tensile strength and substantially no fear of stress-crack.

In addition to LLDPE and the crosslinked polyethylene, HDPE having a density of 0.950–0.960 $g/cm^3$ can also be used equivalently as one component of the utilizable synthetic resin. This HDPE can be obtained by polymerizing ethylene at normal temperature and pressure with the aid of a specific organometallic compound as catalyst, and has a density usually from 0.94 to 0.96 $g/cm^3$ and a linear chain free of any long branched chain. As compared with polyethylene of the other types, therefore, this HDPE is very excellent in heat resisting property and mechanical strength. This HDPE has such fundamental characteristic properties as a tensile strength of about 370 $kg/cm^2$, an elongation of about 400%, a melting point of 130° C. and a stress-crack resistance of 1000 hours or more. This HDPE has such outstanding properties but has, on the other hand, a hardness as high as 60° in terms of Shore D hardness.

In the present invention, the utilizable polyethylene resin can be selected widely from various classes of polyethylene. This is apparently due to the joint use of SEBS which makes it possible to select the utilizable polyethylene from various kinds of polyethylene.

By the term "stress-crack resistance (or resisting property)" is meant herein a value measured according to the environmental stress cracking test under the constant strain (JIS K-6760), one of the testing methods for polyethylene, wherein a test piece of polyethylene is allowed to stand in a given environment under a constant strain for a period of time until any crack takes place in the test piece which is then measured. This test item is very important and significant in the evaluation of the quality of the resinous coat of lining materials used for city water pipe lines.

The styrene-ethylene-butylene-styrene resin (SEBS) used as the other component of the synthetic resin in the present invention is produced by hydrogenating residual double bonds of styrene-ethylene-butylene-styrene block copolymer and has polystyrene moieties on both edns of the linear molecular chain. This SEBS is one of the saturated thermoplastic elastomers and so is excellent in flexibility. This property makes SEBS particularly suitable as a material constituting a resinous coat for lining materials. On the other hand, however, SEBS is inferior in the stress-crack resisting property and therefore is not suited alone as a resinous coat of a tubular lining material for city water pipe lines. In general, commercially available SEBS has been incorporated with additives such as polypropylene or an oily substance with a view to improving its stress-crack resistance and softness or facilitating the flow of molten resin at the time of molding. However, such additives, especially a stabilizer in the polypropylene and the oily substance can contaminate water, thus making it impossible to employ the commercially available SEBS as such for the lining material for city water pipe lines. In actual use of SEBS for mixing with the utilizable polyethylene component, therefore, commercially available SEBS has to be purified to eliminate such harmful additives. Alternatively, pure SEBS free from the polypropylene and the referenced oily substance may be synthesized from the constituent monomers instead of purifying the commercially available product.

In the present invention, the flexible synthetic resin utilizable as the resinous coat of the lining material is obtained by mechanically blending the polyethylene resin with SEBS free from any contaminant additives. By blending these components, the drawbacks of the individual components, for example, poor flexibility of the high density polyethylene resin and the poor stress-crack resisting property of the SEBS, are fully compensated for so that only the excellent merits of the individual components are experienced. Thus, the synthetic resin used in the present invention exhibits excellent flexibility, and durability, represented by abrasion-resistance, tensile strength, and mechanical strength combined with stress-crack resistance and is substantially devoid of drawbacks, as seen in the individual components. This synthetic resin is also excellent in extrusion characteristics and heat resistance. To attain the desired effects, however, the polyethylene resin and SEBS are blended in a specific proportion. In principle, 60–40% by weight of the polyethylene resin is blended with 40–60% by weight of SEBS. Preferably, both components are blended in a weight ratio of 50:50. If the proportion of the polyethylene resin is more than 60% by weight, the resultant blend becomes harder and poor in flexibility so that the evagination work for the lining material with a resinous coat of this resin becomes difficult. On the other hand, if the proportion of the polyethylene resin is less than 40% by weight, the resultant blend although improved in flexibility is poor in stress-crack resistance, thus making it undesirable to use the blended resins for a resinous coat of the lining material for city water pipe lines.

The flexible synthetic resin used in the present invention, which is a blend of the polyethylene resin and SEBS, should have a stress-crack resistance of at least 1000 hours and desirably has a Shore D hardness of about 40° and improved extrusion characteristics, e.g. an MFR value (JIS K-6760) as low as 1-2 g/10 minutes. If the MFR value becomes higher, the resin will easily undergo molecular orientation and, as a result, the stress-crack resistance will become poor.

The flexible synthetic resin is applied onto the exterior surface of the tubular textile jacket according to any suitable method known in this art. For example, the resin is once molten and applied from an annular extruder onto the exterior surface of the tubular textile jacket passing therethrough in an inflated state to form a circle in cross section. In this case, the synthetic resin is allowed to penetrate sufficiently into the interstices of the fabric structure of the textile jacket thereby assuring bonding of the resinous coat onto the textile jacket by means of the so-called "anchoring action" of the resin. As the synthetic resin has no reactive functional groups, bonding of the resin to the textile jacket is attained only by physical means. It is therefore necessary to allow the resin to penetrate into the interstices of the fabric structure to fix the resin to the jacket by means of the anchoring action, the textile jacket being so devised, as will be described hereinafter, that the threads constituting the textile jacket are made of a specific combination of filament yarns with spun yarns and/or spun-like textured yarns. On extrusion of the resin, the inside of the inflated tubular textile jacket may be evacuated to promote penetration of the resin into the interstices of the fabric structure.

The thickness of the resinous coat formed on the exterior surface of the tubular textile jacket varies according to various factors, chiefly the diameter of the tubular lining material. Usually, the resinous layer is used at a thickness within the range of 0.3–1.8 mm, preferably 0.5–1.5 mm, most preferably 0.8–1.2 mm, although the thickness can vary according to a number of factors. In case of a tubular textile jacket of 200 mm in diameter, for example, the thickness of the resinous layer is usually within the range of 0.4–1.0 mm, preferably 0.5–0.8 mm. If the thickness is extremely thin, it will cause the formation of pinholes or other mechanical damage to the resinous layer on evagination of the lining material.

The tubular textile jacket as substrate of the lining material can be manufactured by weaving warps and a weft in a tubular form in a manner known per se. The term "weaving (or woven)" means herein both of the modes of "weaving (or woven)" and "knitting (or knitted)". In the present invention, it is one of the characteristic features that either or both of the warps and the weft is comprised of threads manufactured by intertwisting filament yarns with spun yarns and/or spun-like textured yarns of synthetic fibers. In general, filament yarns are of high tenacity while spun yarns are fluffy and excellent in adhesion to the resin. As the synthetic resin used in the present invention does not exhibit chemically reactive groups to react with the yarns, strong chemical adhesion cannot be expected, but bonding of the resin is exclusively attained by physical adhesion. In the case when the tubular textile jacket is woven only with spun yarns, therefore, some improvement may be expected in the adhesion strength. However, such spun yarns are poor in tenacity and cannot maintain the strength and pressure-resisting properties necessary for the lining material unless thicker yarns are used in a large amount. In the present invention, therefore, threads manufactured by intertwisting strong filament yarns with spun yarns and/or spun-like textured yarns which are poor in tenacity but excellent in bonding with the resin are used for at least one of the warps and the weft. The spun-like textured yarns are manufactured by processing the filament yarns to have the characteristics of spun yarns and are equivalent in the nature to spun yarns. The proportion of the filament yarns to the spun yarns can vary freely according to various factors such as strength, pressure-resisting property, etc. If the threads are used for both of the warps and the weft, the tubular textile jacket manufactured therefrom will be improved in strength and adhesion in both lengthwise and lateral directions.

BRIEF DESCRIPTION OF THE DRAWINGS

The present invention can be more fully understood from the following description taken in conjunction with the accompanying drawings in which:

In FIGS. 1 and 2, a tubular textile jacket 1 is overlaid with a resinous coat 2 of the flexible synthetic resin and has been woven with a plurality of warps 3 and a weft 4. Synthetic fiber yarns, usually those of the polyester series are used for the warps 3 and the weft 4 but either or both of the warps 3 and the weft 4 has to be woven partially or wholly with threads manufactured by intertwisting filament yarns with spun yarns and/or spunlike textured yarns of synthetic yarns, preferably polyester fiber yarns. The synthetic resin used for the resinous coat 2 is a blend of 60–40% by weight of the above described polyethylene resin and 40–60% by weight of SEBS having a stress-crack resisting property of at least 1000 hours.

Figure 1:
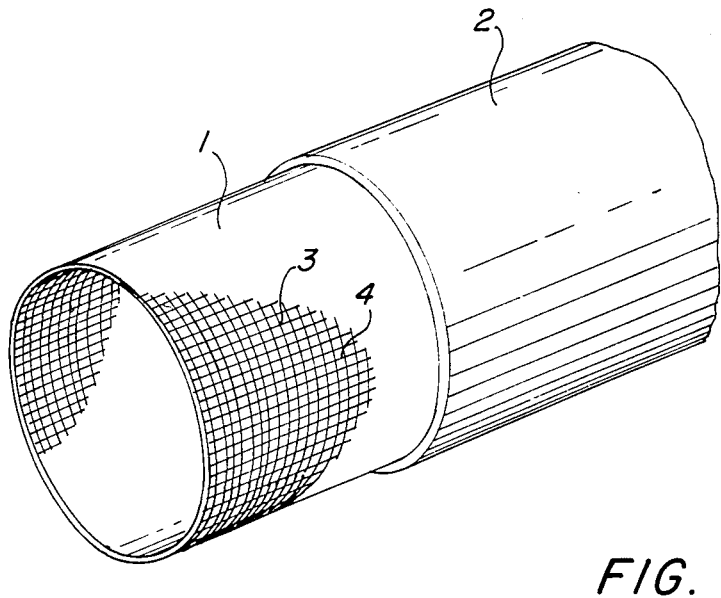
FIG. 1 is a schematic partially broken perspective view of one example of the tubular lining material of the present invention for city water pipe lines.

In one example of the tubular lining material of the present invention for a city water pipe line of 200 mm in diameter, a tubular textile jacket 1 was made of 638 warps 3, each comprised of two yarns each of which was made by twisting four 100 denier polyester filament yarns and a weft 4 made by intertwisting two 1000 denier polyester filament yarns with four 20 count number polyester spun yarns at a twisting rate of 2.0–2.5 times/inch and picked up at 62 pick count/10 cm. In this example, threads made by intertwisting the polyester filament yarns with the polyester spun yarns is used as weft 4. The tubular textile jacket 1 thus manufactured is perspectively shown in FIG. 1 (left side).

A flexible synthetic resin, as illustrated in the Examples given hereinafter, was then applied onto the exterior surface of the tubular textile jacket by extruding the molten synthetic resin from an annular nozzle of an extruder onto the tubular textile jacket while inflating the tubular textile jacket by any appropriate means such as a mandle inserted into the jacket. The inside of the jacket may be evacuated after the resin has been applied onto the jacket to facilitate penetration of the molten resin into the interstices of the fabric structure. The thickness of the resinous coat may precisely be adjusted by using an appropriate doctoring means. The tubular textile jacket 1 with the resinous coat 2 on the exterior surface thereof thus manufactured is shown in FIG. 1 (right side).

Figure 2:
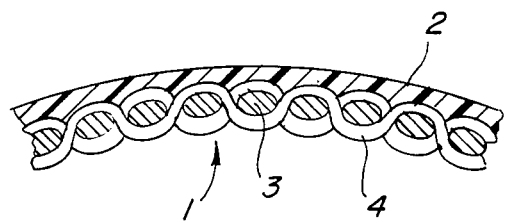
FIG. 2 is a schematic partial section view showing the state of the resinous layer applied on the tubular textile jacket.

FIG. 2 shows the state of the resinous coat 2 on the jacket 1 wherein the resin has completely penetrated into the interstices of the fabric structure formed by the warps 3 and the weft 4 to strengthen the bonding of the resin to the jacket. The bonding between the resin and the jacket is further strengthened by using the threads made by intertwisting the filament yarns and the spun yarns in addition to the anchoring action of the resin penetrating into the interstices of the fabric structure.

In the above example, the spun yarns are used in the weft. However, the spun yarns may be used partially or wholly in the warps or both the warps and the weft. In addition, the spun yarns may be replaced partially or wholly by the spunlike textured yarns. Thus, a number of combinations of the threads can be used according to the intended purpose and the size of the lining material. In case of the tubular lining material used for a large city water pipe line of 400 mm or more in nominal diameter, for example, the threads manufactured by intertwisting the filament yarns and the spun yarns are preferably used as warps and a strong filament yarn alone is used as weft to prevent deterioration of the pressure-resisting property.

Next, a synthetic resin as shown in the following Examples and Comparative Examples was applied through an extruder onto the tubular textile jacket to form a resinous coat thereon. The tubular lining material thus manufactured was then tested for various test items properties as shown in Table 1. In each Example the synthetic resin of the present invention, which is a blend of the polyethylene resin and SEBS, is used while either of the polyethylene resin and SEBS is used in each Comparative Example. Results of the tests are shown in Table 1.

EXAMPLE 1

A tubular lining material having as a resinous coat a blend of LLDPE (Yukalon LL marketed by Mitsubishi Yuka LL, Japan) and SEBS (Kraton G marketed by Shell Kagaku KK, Japan) in a ratio of 50:50.

EXAMPLE 2

A tubular lining material having as a resinous coat a blend of the crosslinked polyethylene resin (Linklon marketed by Mitsubishi Yuka KK, Japan) and SEBS (Kraton G) in a ratio of 50:50.

EXAMPLE 3

A tubular lining material having as a resinous coat a blend of HDPE (Hi-zex mareketed by Mitsui Sekiyu Kagaku KK, Japan) and SEBS (Kraton G) in a ratio of 50:50.

COMPARATIVE EXAMPLE 1

A tubular lining material having LLDPE (Yukaon LL) alone as a resinous coat.

COMPARATIVE EXAMPLE 2

A tubular lining material having HDPE (Hi-zex 5000-H) alone as a resinous coat.

COMPARATIVE EXAMPLE 3 a tubular lining material having SEBS (Elastomer AR-7700 marketed by Aron Kasei KK, Japan) alone as a resinous coat.

Below is a brief explanation on each test item listed in Table 1.

Hardness: measured by Shore D hardness (JIS D-2240)

Density: measured according to JIS K-7112

Tensile strength: measured according to ASTM D-6381

Elongation: same as above

Stress-crack resisting property: measured according to ASTM D-1693

Melting point of the resin: measured according to ASTM D-2117

Amount of residual chlorine: measured according to JWWA K-115

Amount of potassium permanganate consumed in the resin: same as above

Evagination of the tubular lining material: a pressure required for allowing the lining material to advance while being evaginated.

TABLE 1

| Test items | Example 1 | Example 2 | Example 3 | Comparative Example 1 | Comparative Example 2 | Comparative Example 3 |
| --- | --- | --- | --- | --- | --- | --- |
| Hardness (Shore D) | 40 | 40 | 42 | 50 | 60 | 70(Shore A) |
| Density (g/cm$^3$) | 0.92 | 0.92 | 0.93 | 0.92 | 0.96 | 1.00 |
| Tensile strength (kg/cm$^2$) | 246 | 240 | 260 | 330 | 300 | 140 |
| Elongation (%) | 810 | 800 | 600 | 740 | 500 | 750 |

TABLE 1-continued

| Test items | Example 1 | Example 2 | Example 3 | Comparative Example 1 | Comparative Example 2 | Comparative Example 3 |
|---|---|---|---|---|---|---|
| The stress-crack resisting property | >1000 | >1000 | >1000 | >1000 | >1000 | 500 |
| Melting point (°C.) | 125 | 130 | 130 | 120 | 132 | 130 |
| Amount of residual chlorine reduced (ppm) | 0.4 | 0.4 | 0.4 | 0.1 | 0.2 | >0.8 |
| Amount of potassium permanganate consumed (ppm) | 0.5 | 0.5 | 0.5 | 0.7 | 0.5 | 2.0 |
| Pressure for evagination (kg/cm$^2$) | 0.8 | 0.8 | 0.8 | 1.3 | >2.0 | 0.7 |

As is evident from Table 1, the tubular lining material of the present invention is so excellent in flexibility that evagination of the lining material is smooth and the lining treatment of city water pipe lines becomes relatively easy and simple. The lining material is also excellent in the heat-resisting property and stress-crack resisting property so that there is no fear of contaminating the drinking water by the use of the lining material. Since the tubular lining material of the present invention employs threads manufactured by intertwisting filament yarns with spun yarns and/or spun-like textured yarns for either or both of the warps and the weft, bonding between the textile jacket and the resin becomes strong even when the resin contains the polyethylene component.

A tubular lining material having as a resinous coat a blend of LLDPE and SEBS in a ratio of 50:50 was tested for the various test items required for the drinking water test according to JWWA K-115. Results of the tests are shown in Table 2 together with the results of the tests performed for a test piece of the same resin.

TABLE 2

| Test item | The resin as resinous coat | Test piece of the resin |
|---|---|---|
| Turbidity | Below 0.5 | Below 0.5 |
| Color scale | Below 1 | Below 1 |
| Amount of potassium permanganate consumed (ppm) | 1.3 ppm | 0.5 ppm |
| Amount of residual chlorine reduced (ppm) | 0.2 ppm | 0.4 ppm |
| Phenols | Below 0.005 ppm | Below 0.005 ppm |
| Amines | Not detected | Not detected |
| Cyanide | Not detected | Not detected |
| Odor and taste | Not changed | Not changed |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tubular lining material for city water pipe lines, applicable onto the inner surface of a city water pipe line in such manner that the tubular lining material with a binder on the inner surface thereof is inserted into the pipe line and allowed to advance within the pipe line while turning the tubular lining material inside out under fluid pressure thereby applying the tubular lining material onto the inner surface of the pipe line with the binder being interposed between the pipe line and the tubular lining material, which comprises a textile jacket made of warps and a weft woven in a tubular fabric structure form overlaid with a fluid-impervious coat of a flexible synthetic resin, at least one of the warps and the weft of said textile jacket being comprised of threads of intertwined filament yarns with spun yarns and/or spun-like textured yarns of synthetic fibers, said flexible synthetic resin comprising a blend of 60-40% of a polyethylene resin and 40-60% of a styrene-ethylene-butylene-styrene resin having a stress-crack resistance of at least 1000 hours, said flexible synthetic resin being present in the interstices of said fabric structure of said tubular textile jacket.

2. A tubular lining material according to claim 1, wherein said polyethylene resin is selected from at least one member of the group consisting of a linear low density polyethylene resin having a density of 0.920-0.930 g/cm$^3$, a crosslinked polyethylene resin having a density of 0.920-0.930 g/cm$^3$, and a high density polyethylene resin having a density of 0.950-0.960 g/cm$^3$.

3. A tubular lining material according to claim 2, wherein said polyethylene resin is a linear low density polyethylene resin having a density of 0.920-0.930 g/cm$^3$.

4. A tubular lining material according to claim 2, wherein said polyethylene resin is a crosslinked polyethylene resin having a density of 0.920-0.930 g/cm$^3$.

5. A tubular lining material according to claim 2, wherein said polyethylene resin is a high density polyethylene resin having a density of 0.950-0.960 g/cm$^3$.

6. A tubular lining material according to claim 1, wherein said styrene-ethylene-butylene-styrene resin component is substantially free of contaminants.

7. A tubular lining material according to claim 6, wherein said styrene-ethylene-butylene-styrene resin component is pure.

* * * * *